United States Patent [19]
Rao et al.

[11] Patent Number: 5,987,445
[45] Date of Patent: *Nov. 16, 1999

[54] DELTA LEARNING SYSTEM FOR USING EXPERT ADVICE TO REVISE DIAGNOSTIC EXPERT SYSTEM FAULT HIERARCHIES

[75] Inventors: R. Bharat Rao, Princeton; George A. Drastal, Trenton; Russell Greiner, Plainsboro, all of N.J.

[73] Assignee: Siemens Corporate Research, Inc., Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/583,249

[22] Filed: Jan. 5, 1996

[51] Int. Cl.$^6$ ...................................................... G06F 17/00
[52] U.S. Cl. .................................. 706/61; 706/45; 706/46
[58] Field of Search .................................. 395/52, 77, 50; 706/45, 46, 47, 52, 60, 61

[56] References Cited

U.S. PATENT DOCUMENTS

| | | | |
|---|---|---|---|
| 5,005,143 | 4/1991 | Altschuler et al. | 702/181 |
| 5,481,649 | 1/1996 | Birdwell et al. | 706/59 |
| 5,787,274 | 7/1998 | Agrawal et al. | 707/102 |

OTHER PUBLICATIONS

Artificial Intelligence, vol. 35, No. 2, Jun. 1998, pages 197–226, XP000052393 Ginsberg A et al; "Automatic Knowledge Base Refinement for Classification Systems".

IEEE Expert, vol. 8, No. 6, Dec. 1, 1993, pp. 61–69, XP000414496 Weiss S M et al; "Optimized Rule Induction".

Artificial Intelligence, vol. 45, No. 1/02, Sep. 1, pp. 47–71, XP000140508 Weiss S M et al. Maximizin Predictive Value of Production Rules.

IEEE Expert, vol. 6, No. 5, Oct. 1, 1991, pp. 39–46, XP000297867 Shigenobu Kobyashi et al: "Knowledge Compilation and Refinement for Fault Diagnosis".

Chen, H. She, L. "Inductive Query by Examples (IQBE): A Machine Learning Approach," System Sciences, 1994 Annual Hawaii Int'l Conference, vol. III, pp. 428–437, 1994.

*Primary Examiner*—Tariq R. Hafiz
*Assistant Examiner*—Jason W Rhodes
*Attorney, Agent, or Firm*—Donald B. Paschburg

[57] ABSTRACT

A delta learning system takes as an initial fault hierarchy ($KB_0$) and a set of annotated session transcripts, and is given a specified set of revision operators where each operator within a group maps a fault hierarchy (KB) to a slightly different or revised fault hierarchy ($\theta_t(KB)$). The revised fault hierarchy ($\theta_t(KB)$) is called a neighbor of the fault hierarchy (KB), and a set of all neighbors (N(KB)) is considered the fault hierarchy neighborhood. The system uses the revision operators to hill climb from the initial fault hierarchy ($KB_0$), through successive hierarchies ($KB_1 \ldots KB_m$), with successively higher empirical accuracies over the annotated session transcripts. The final hierarchy ($KB_m$), is a local optimum in the space defined by the revision operators. At each stage, to go from a fault hierarchy ($KB_i$) to its neighbor ($KN_{i+1}$), the accuracy of the fault hierarchy ($KB_i$) is evaluated over the annotated session transcripts, and the accuracy of each fault hierarchy (KB*) belonging to the set of all neighbors (N($KB_i$)) is also evaluated. If any fault hierarchy (KB*) is found to be more accurate than the fault hierarchy ($KB_i$), then this fault hierarchy (KB*) becomes the new standard labeled $KB_{i+1}$.

8 Claims, 7 Drawing Sheets

```
PROCEDURE Eval KB(KB: fault_hierarchy,
            π: problem_instance)
  return(Eval Node (root(KB),π))
END Eval KB PROCEDURE Eval Node (n:NODE,π:total_problem_instance)
  If n is a leaf node
    Then return(r(n))
    Else for i:=1...k(n)  do
        c:=child(n,i)
          If π (t(child))=+   /* if test associated with child is + */
          then return(Eval Node (child,π))
          endif
      endfor
      /* arriving here means NONE of n's children succeeded */
      return(r⊥)
    endif
END Eval Node
```

FIG. 4

```
PROCEDURE Acc KB(KB: fault_hierarchy,
                ⟨π, r_cor⟩:training_example)
  switch (EVAL NODE*(root(KB),π))
  {
    case r_cor:   return(1.0)    /* found correct repair */
    case ?:       return(PARTIAL MATCH (KB,⟨π,r_cor⟩))
    otherwise:    return(0.0)    /* found other repair */
  }
END AccKB PROCEDURE EVAL NODE*(n:NODE,
          π:partial_problem_instance)
  If n is a leaf node
    Then return(r(n))
    Else for i:=1..k(n)
      do c:=child(n,i)
        If π (t(child))=+   /* if test associated with child is + */
        then return(EVAL NODE * (child,π))
        else if π(t(child))=?
          then return(?)
        endif
      endif
    endfor
    /* arriving here means NONE of n's children succeeded */
    return(r_⊥)
  endif
END EVAL NODE
```

FIG. 5

```
PROCEDURE PARTIAL MATCH (KB: fault_hierarchy,
                        c: training_example)
    c:= ⟨π, r_cor⟩
    prob: =0.0
    for all h_i := ⟨π_i, r_i⟩ ∈ H(KB) such that r_i = r_cor
        do prob:=prob +PROB CORRECT PATH (π, π_i)
    endfor
END PARTIAL MATCH PROCEDURE PROB CORRECT PATH (
         π  : partial_problem_instance,
         π_i : partial_problem_instance)
    p':=1.0
    for t ∈ π_i
        do switch (π(t))
        {
        case ?: p':=p' x p(t= π_i(t))
           /* prob that t has the value needed by π_i */
        case π_i(t): /* no change */
        otherwise: return(0)  /* different, so prob is 0 */
        }
    endfor
    return(p')
END PROB CORRECT PATH
```

FIG. 6

```
PROCEDURE DELTA(KB: fault_hierarchy, C: labeled_session_transcripts)
  N(KB):=COMPUTENEIGHBORHOOD(KB)
  KB*:=COMPUTEBEST(N(KB),C)
  If AccKB(KB*,C)>AccKB(KB,C) then return(DELTA(KB*,C)) else return(KB)
  endif
END DELTA
PROCEDURE COMPUTEBEST(N: fault_hierarchies, C: labeled_session_transcripts)
  KB*:=argmax{ Σ(AccKB(KB,cᵢ)) |KB∈N }
  return(KB*)   cⱼ∈C
END COMPUTEBEST
PROCEDURE COMPUTENEIGHBORHOOD(KB:fault_hierarchy)
  N:=append(CNADDLINK(KB), CNDELETELINK(KB) CNMOVENODE(KB),CNSWITCHNODES(KB))
  return(N)
END COMPUTENEIGHBORHOOD
PROCEDURE CNADDLINK(KB:fault_hierarchy)
  N:={}
  /* ALLNODES(KB) is list of all nodes in fault_hierarchy */
  for p∈ALLNODES(KB) such that k(p)≥1    /* all non leaf nodes */
    do for c∈ALLNODES(KB) such that c≠p
      do if( -child_p(p,c)    /* no point adding link to existing child */
          &&-IsAncestor(c,p))  /* no cycle */
        then for j:=1..(k(p)+1)   /* for all positions under p */
          do N:=append(N,ADD(p,cj))
          endfor
        endif
      endfor
    endfor
  return(N)
END CNAddLINK
PROCEDURE CNDELETELINK(KB: fault_hierarchy)
  /* all possible deletions, i.e., all parent child pairs */
  N:={ } for p ∈ ALLNODES(KB) such that k(p)≥0   /* all nodes with at least one child */
    do for j:=1..k(c) do N:=append(N,Delete(p,child(p,j)))
    endfor
  endfor
  return(N)
END CNDELETELINK
PROCEDURE CNMOVENODE(KB:fault_hierarchy)
  N:={ }
  /* first consider moving nodes under same parent */
  for p ∈ ALLNODE(KB) such that k(p)≥2  /* all parents with≥2 children */
    do for i:=1..k(p)
      do for j:=1..k(p)
        do if(i≠J)
          then N:=append(N, MOVE(p,p,child(p,i),i,j))
          endif
        endfor
      endfor
    endfor
  endfor
  /* now move nodes under different parents */
  for from_par∈ALLNODES(KB) such that k(from_par)≥2
    do for to_par∈ALLNODES(KB) such that
          k(to_par)≥2 and to_par≠from_par
      do for i:=1..k(from_par)
        do
        ch:=child(from_par,i)
          N:=append(N,MOVE(from_par, to_par, ch, i, j))
        endfor  end if  end for   end for   end for
  return(N)
END CNMOVENODE
```

| | $c_1$ ... | $c_j$ | ... $c_{|c|}$ | C |
|---|---|---|---|---|
| KB | • ... | • | ... • | acc(KB,C) |
| $\theta_1$(KB) | • ... | • | ... • | acc($\theta_1$(KB),C) |
| ⋮ | ⋮ | | ⋮ | ⋮ |
| $\theta_j$(KB) | • ... | acc($\theta_j$(KB),$c_j$) | ... • | acc($\theta_j$(KB),C) |
| ⋮ | ⋮ | • | ⋮ | ⋮ |
| $\theta_m$(KB) | • ... | • | ... • | acc($\theta_m$(KB),C) |

FIG. 8

```
PROCEDURE CNSwitchNodes (KB: fault_hierarchy)
  N:={ }
  for p∈AllNodes(KB) such that k(p)≥2   /* at least 2 children to switch */
    do
    for i:=1..(k(p)-1)
      do
      for j:=i..k(p)
        do N:=append(N,SWITCH(p,child(p,i),child(p,j)))
      endfor
    endfor
  endfor
  return(N)
END  CNSwitchNodes PROCEDURE IsAncestor(n_1,n_2)
  /* Returns TRUE iff n_1 an ancestor of n_2 */
  if (l(n_2)=0)
    then return(FALSE)
    else for i:=1..l(n_2)
      do p_2:=parent(n_2,i)
        if((n_1=p_2) OR IsAncestor(n_1,p_2))
          then return(TRUE)
        endif
      endfor
    endif
END  IsAncestor
```

DELTA LEARNING SYSTEM FOR USING EXPERT ADVICE TO REVISE DIAGNOSTIC EXPERT SYSTEM FAULT HIERARCHIES

BACKGROUND OF THE INVENTION

1. Field of the Invention

The present invention relates to a "theory revision" system that identifies a sequence of revisions which produces a theory with highest accuracy and more particularly, to a system that uses a given set of annotated session transcripts and a given set of possible theory-to-theory revision operators to modify a given theory, encoded as a fault hierarchy, to form a new theory that is optimally accurate.

2. Description of the Prior Art

Many expert systems use a fault hierarchy to propose a repair for a device based on a set of reported symptoms test values. Unfortunately, such systems may return the wrong repair if their underlying hierarchies are incorrect. A theory revision system uses a set, C, of "labeled session transcripts" (each transcript includes answers to the tests posed by the expert system and the correct repair as supplied by a human expert) to modify the incorrect fault hierarchy, to produce a new hierarchy that will be more accurate. Typical revision systems compare the initial hierarchy, KB, with each of its neighbors in $N(KB)=\{KB_k\}$, where each $KB_k$ is formed from KB by performing a single simple revision, such as deleting a connection between a pair of fault nodes, or altering the order in which some fault nodes are considered. These revision systems will climb from KB to a neighboring $KB^* \in N(KB)$ if $KB^*$'s empirical accuracy over C is significantly higher than KB's.

There are many theory revision systems described in the machine learning literature. They all use the same basic idea of using a set of transformations to convert one theory to another. Most of these systems focus on Horn clause knowledge bases or decision trees. These representations are not particularly suited to deployed application systems. By contrast, the Delta system uses a fault hierarchy representation which is widely deployed. Further, the modifications suggested by existing theory revision systems could result in theories which would be rejected by domain experts. By contrast, the Delta system suggests modifications which preserve the structure of the fault hierarchy, and thus are more likely to be acceptable to domain experts. Finally, these systems assume that the training data (i.e., the annotated session transcripts), used to decide which knowledge base is most accurate, will include answers to all relevant tests. This is not realistic in many standard situations, where each training instance includes only the minimal amount of information required to reach an answer, relative to a particular theory. In contrast, the Delta system is designed to evaluate any theory's accuracy, even with incomplete data.

SUMMARY OF THE INVENTION

The present invention is a computer system, known as Delta, which takes as input an initial fault hierarchy $KB_0$ and a set of annotated session transcripts $C=\{<\pi_j,r_j>\}$, where 90 $_j$ includes the answers to all tests presented to the expert system, and the correct repair $r_j$ is supplied by a human expert. The present invention is given a specified set of revision operators $T=\{\theta_j\}$ where each $\theta_i \in T$ maps a fault hierarchy KB to a slightly different hierarchy $\theta_i(KB)$. This revised fault hierarchy $\theta_i(KB)$ is called a neighbor of KB, and the set of all neighbors of KB, $N(KB)=\{\theta_i(KB)\}$, is KB's neighborhood.

The present invention uses T to hill climb from the initial fault hierarchy $KB_0$, through successive hierarchies, $KB_1$ . . . $KB_m$, with successively higher empirical accuracies over C; the final hierarchy, $KB_m$, is a local optimum in the space defined by the revision operators. At each stage, to go from a fault hierarchy $KB_k$ to its neighbor $KB_{k+1}$, the present invention must evaluate $KB_i$'s accuracy over C, as well as the accuracy of each $KB' \in N(KB_k)$. If any KB' is found to be more accurate than $KB_k$, this KB* hierarchy becomes the new standard, labeled $KB_{k+1}$, and the theory revision process iterates, seeking a neighbor of this $KB_{k+1}$, that is more accurate than $KB_{k+1}$ over the set of examples C, and so forth. Otherwise, if no KB' is more accurate than $KB_k$, the hill climbing process will return this $KB_k$, and terminate.

If the labeled session transcripts $C=\{<\pi_j,r_j>\}$ are complete (that is, each $C_j \in C$ contains answers to every possible test in KB) then it is straightforward to evaluate KB's empirical accuracy over C. In practice, however, C is typically incomplete, as each $\pi_j$, contains only a small subset of the test values in KB. The theory revision system of the present invention provides a way of evaluating the empirical accuracy of KB, and each $KB' \in N(KB)$, even when C is incomplete.

BRIEF DESCRIPTION OF THE DRAWINGS

FIG. 6 illustrates the Delta and ComputeBest Subroutines of one embodiment of the present invention.

DETAILED DESCRIPTION OF THE INVENTION

Figure 1:
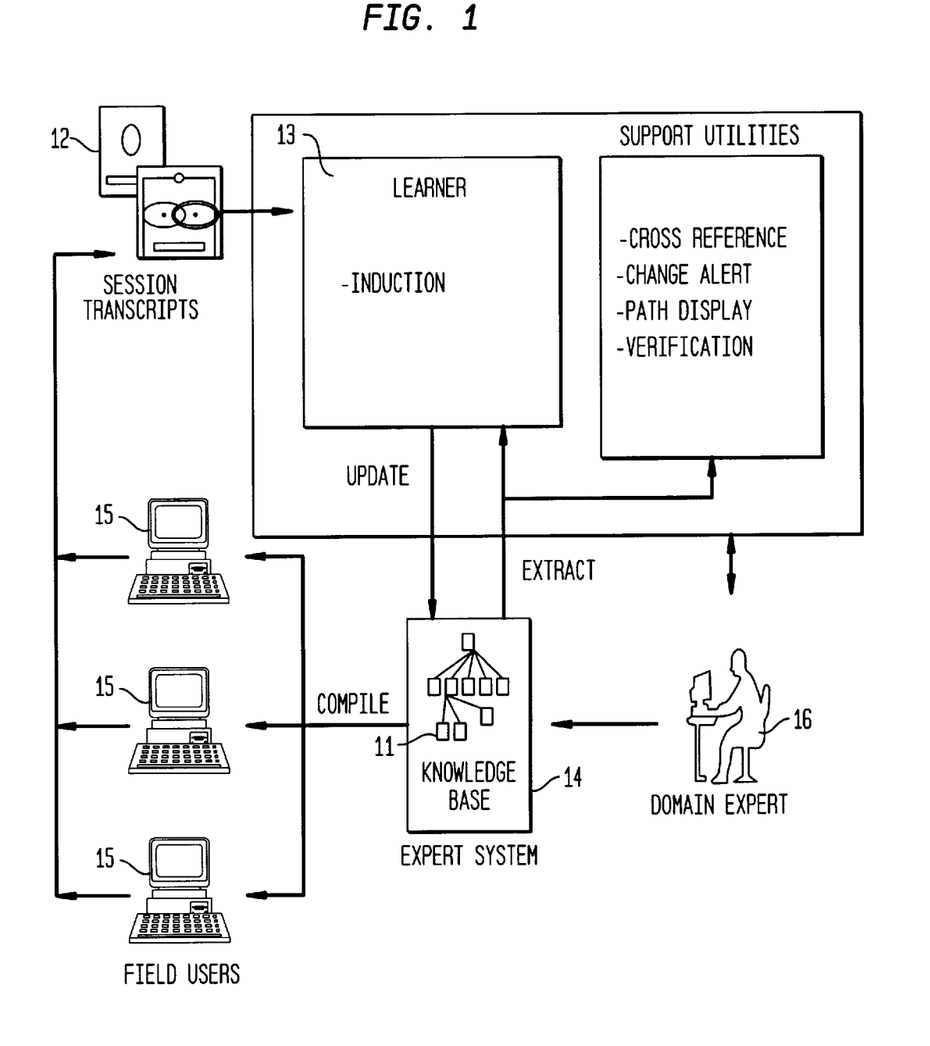
FIG. 1 illustrates an overall theory revision task that utilizes the present invention.

FIG. 1 illustrates the overall theory revision task. Given a knowledge base 11 KB and user feedback (a set of training examples, each a session transcript 12 annotated by a correct answer) a theory revision system 13 produces a new knowledge base KB' which exhibits better performance over the training examples. In more detail, sesssion transcripts 12 are collected after deploying the expert system 14 to field users 15. Each transcript 12 will include answers to the tests requested by the expert system 14 as well as the repair suggested by the expert system 14. When appropriate (such as when the sugggested repair is incorrect), a domain expert 16 will annotate these transcripts to indicate missing tests and appropriate repairs. The theory revision system 13 (such as the present invention) uses these annotated transcripts as training data to suggest revisions to the knowledge base 11. Finally, the domain expert 16 evaluates these revisions to decide whether to incorporate them into the knowledge base 11 which can then be redeployed.

Many currently deployed expert systems use a fault hierarchy to propose a repair for a device, based on a set of reported symptoms. Unfortunately, due to modifications of the basic devices, new distribution of faults as the device ages and the installation of new devices, as well as errors in the original knowledge base, these proposed repairs may not always be the correct repair. A "theory revision" system uses a set of "labeled session transcripts" to modify the incorrect fault hierarchy to produce a new hierarchy that is more accurate. As no efficient algorithm is guaranteed to find the globally-optimal hierarchy, many projects implement their theory revision systems as a hill-climbing process that climbs, in a series of steps, to a hierarchy whose accuracy is locally optimal. On each step, each such system computes the empirical accuracy, relative to the given set C of labeled session transcripts, of the current hierarchy KB and each of KB's "neighbors", $N(KB)=\{KB_k\}$, where each neighbor $KB_k \in N(KB)$ is a slight modification of KB. The theory revision system then selects the neighbor $KB^* \in N(KB)$ with the highest empirical accuracy and if $KB^*$'s accuracy is greater than KB's, the theory revision process iterates. It then compares this $KB^*$ with each of its neighbors and climbs to any neighbor that is better. If the labeled session transcripts $C=\{<\pi_j,r_j>\}$, are complete (that is, each $C_j \in C$ contains answers to every possible test in KB) then it is straightforward to evaluate KB's empirical accuracy over C. In practice, however, C is typically incomplete, as each $\pi_j$ contains only a small subset of the test values in KB. The theory revision system of the present invention provides a way of evaluating empirical accuracy of a fault hierarchy and each of its neighbors, relative to a given set of labeled session transcripts, even when the transcripts are incomplete.

The following defines the structures of both fault hierarchies and of problem instances and then describes how a fault-hierarchy-based expert system works: by evaluating a hierarchy in the context of an instance to produce a repair. Each fault hierarchy $KB=<N, E, TS, R, t(\cdot), r(\cdot), child(\cdot,\cdot)>$ is a directed-acyclic forest $<N,E>$, whose nodes, N, represent faults, and whose edges, E, connect faults to subordinate faults. Each node $n \in N$ is labeled with a test $t(n)=t$ or $t(n)=\neg t$, where $t \in TS$. In addition, each leaf node is also labeled with a "repair", $r(n)=r \in R$. The arcs under each internal node are ordered; child (n,i) refers to the "$i^{th}$ child of n". To simplify the notation, let the $k:N \rightarrow Z^+$ function map each node to its number of children, and let the $1:N \rightarrow Z^+$ function map each node to its number of parents.

Figure 2:
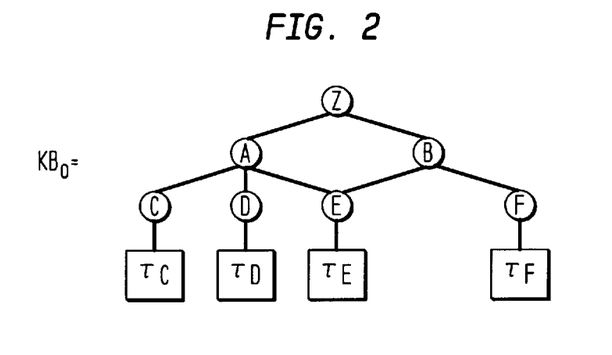
FIG. 2 illustrates the structure of a fault hierarchy ($KB_0$) used by one embodiment of the present invention.

For example, consider the hierarchy shown in FIG. 2, where the test associated with the node $\chi$ is $T_\chi$. Hence, the test associated with the A node is $T_A$, etc. The $r_\chi$ expression is the repair labeling the associated leaf node *. Hence, the repair associated with the node D, whose test is $T_D$, is $r_D$. A's children are, in order, C, D and E. Hence child(A, 1)=C, child(A, 2)=D and child(A, 3)=E. Here, k(A)=3. Similarly parent (A, 1)=Z, and 1(A)=1.

When run, the expert system that uses the KB hierarchy, called $S_{KB}$, will ask the user a series of questions. These questions correspond to a depth-first, left-to-right, no-backtrack traversal of (part of) the KB structure. Here, $S_{KB_0}$ begins at the root, and asks the question associated with that node; here "Is $T_Z$ true?". If the user answers "yes", $S_{KB_0}$ descends to consider Z's children, in left-to-right order— here next asking "Is $T_A$ true?". If the user responds "Yes", $S_{KB_0}$ will descend to A's children. If the user answers $T_C$ with "No", $S_{KB_0}$ will continue to C's sibling D, and ask about $T_D$. Assuming the user responds "Yes" here, $S_{KB_0}$ will return the repair associated with that leaf node, D, here $r_D$. On the other hand, if the user had responded "No" to $T_D$, $S_{KB_0}$ would have continued to ask about $T_E$. If this answer was "Yes", $S_{KB_0}$ would return $r_E$. Otherwise, if this answer was also "No", $S_{KB_0}$ would return the "No-Repair-Found" answer, $r_\perp$. N.b., $S_{KB_0}$ will not then continue to B; answering $T_A$ with "Yes" means the user will only consider tests and repairs under this node.

Figure 3:
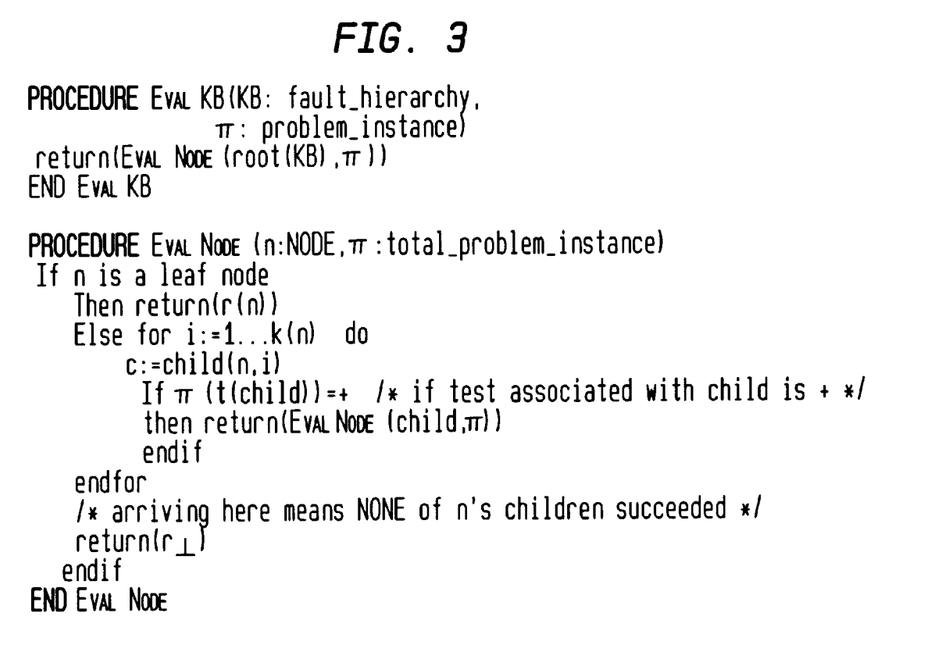
FIG. 3 illustrates the EvalKB and EvalNode Subroutines of one embodiment of the present invention.

Ignoring the details of the actual user-interaction, each "total problem instance" is an assignment $\pi:TS \rightarrow \{+,-\}$ that maps each test to one of $\{+,-\}$, where "+" means the test was confirmed (passed), and "-" means the test was disconfirmed (failed). Given an instance $\pi$, $S_{KB}$ will return a repair $r \in R$, written as $EVALKB(KB,\pi)=r$. This r is the value returned by $EVALNode(root(KB),\pi)$, using the EVALNode subroutine shown in FIG. 3, where $n_{root}=root(KB)$ is KB's root. On calling EVALNode, it is assumed that the test associated with $n_{root}$ has already been confirmed, i.e., that $\pi(t(n_{root}))=+$. This test $t(n_{root})$ is viewed as the symptom or triggering information. $S_{KB}$ only considered using this subtree after it observed this test value. It is also assumed that the root's test has been confirmed when dealing with the AccKB subroutine defined below.

The accuracy of the hierarchy KB for the instance $\pi$ is $$acc(KB, \langle \pi, t_{cor} \rangle) = \begin{cases} 1 & \text{if } EVALKB(KB, \pi) = r_{cor} \\ 0 & \text{otherwise} \end{cases}$$

where the correct answer to the instance is $r_{cor} \in R$. (This $r_{cor}$ repair is often supplied by a human expert.) In general, such a pair $<\pi,r_{cor}>$ will be referred to as a "labeled (total) problem instance". Over a set of labeled instances (a.k.a. session transcripts) $C=\{<\pi_i,r_i>\}_i$, KB's (empirical) accuracy is $$acc(KB, C) = \sum_{\langle \pi, r \rangle \in C} acc(KB, \langle \pi, r \rangle) \qquad (1)$$

The average accuracy is this value divided by the number of examples, $|C|$.

These computations assume that $S_{KB}$ is always able to obtain answers to all relevant tests. This is not always true in the theory revision context. Here, the theory revision system may only know some of the required answers. To allow us to consider the results an expert system might produce in such contexts, we use a "partial problem instance" $\pi:TS \rightarrow \{+,-,?\}$ where "$\pi(t)=?$" means that the value of the test t is not known.

Each such partial instance $\pi$ really corresponds to some total instance $\pi'$, where certain test values are not observed. To state this more precisely, say that the total problem instance $\pi':TS \rightarrow \{+,-\}$ is a completion of $\pi$ if $\pi'$ agrees with $\pi$ whenever $\pi(t)$ is categorical (i.e., is not "?"):

$\pi'$ completes $\pi$ iff $[\pi(t) \neq ? \neg \pi'(t)=\pi(t)]$

Hence the total instance $\pi_{T1}=\{T_Z/+, T_A/+, T_B/-, T_C/-, T_D/+, T_E/+, T_F/-\}$ is a completion of the partial instance $\pi_{P1}=\{T_Z/+, T_A/+, T_B/?, T_C/-, T_D/+, T_E/?, T_F/?\}$.

Let

Complete$(\pi)=\{\pi':TS \rightarrow \{+,-\} | \pi'$ completes $\pi\}$ refer to the set of total instances that complete a given partial instance.

In general, the probability $Pr[\pi'|\pi]$ that the observed partial instance $\pi$ corresponds to the total instance $\pi' \in$ Complete $(\pi)$ depends on the probability that each unobserved test t (i.e. where $\pi(t)=$"?") has the specified value $\pi'(t)$. Here, the probability that the observed $\pi_{P1}$ corresponds to the actual total $\pi_{T1}$ depends on the probabilities that $T_B=-$, $T_E$=+ and $T_F$=--. It will be assumed that these tests are independent (of each other and other context) which means this conditional probability can be expressed in terms of the probability function p:TS→[0,1], where p(t) is the probability that the unobserved test t would succeed, if only it had been run and reported.

Notice that each $\pi' \in$ Complete ($\pi$) has an associated repair, $r_{\pi'}$=EVALKB(KB, $\pi'$); we can therefore use the p(•) values to compute the probability that $S_{KB_0}$ will return each $r_{\pi'}$, given the observed values $\pi$. In general, we will need to compute the probability that $S_{KB_0}$ will return the correct repair $r_{cor}$, $\Pr[S_{KB_0}$ returns $r_{cor}|\pi$ observed]. Using the observation that this quantity corresponds to acc(KB,<,$r_{cor}$>) when $\pi$ is a total instance, acc(•,•) can be extended to be this probability value in general (even when $\pi$ is a partial instance). (The p(•) function is implicit in this acc(KB, <$\pi$,$r_{cor}$>) description.)

Figure 4:
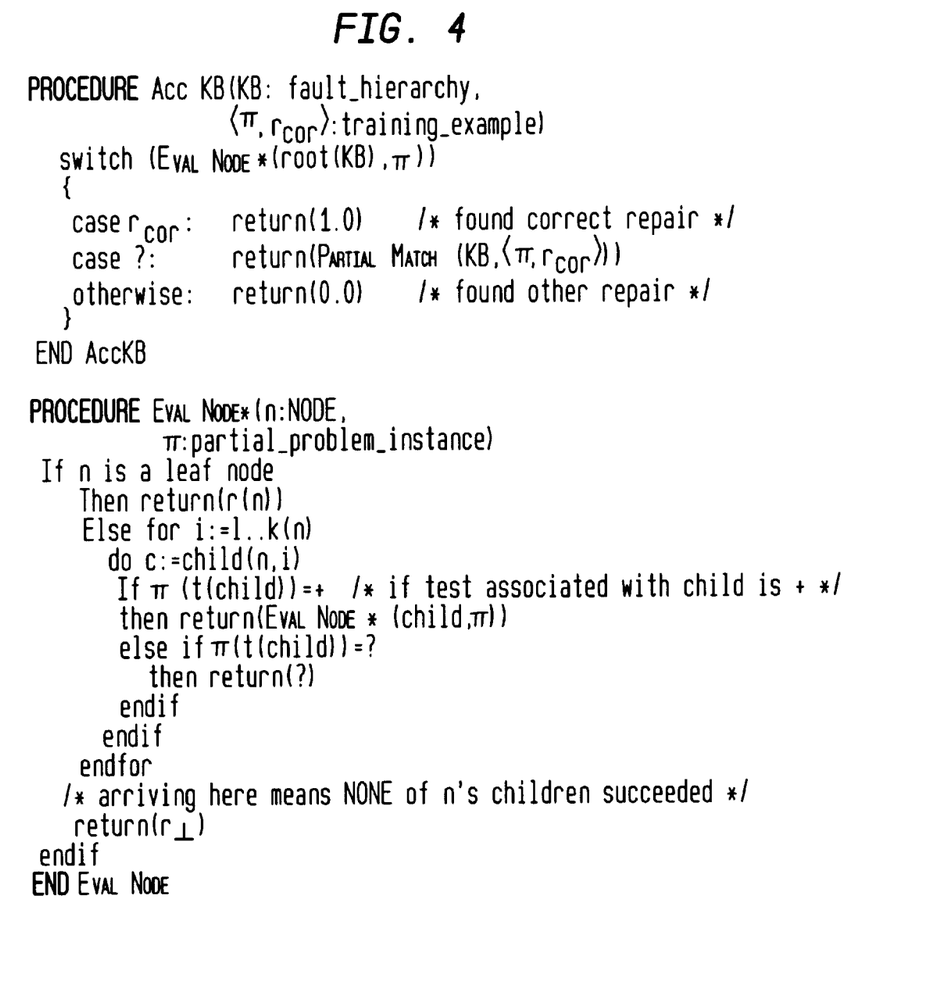
FIG. 4 illustrates the AccKB and EvalNode* Subroutines of one embodiment of the present invention.

The AccKB subroutine illustrated in FIG. 4 computes this probability for a partial problem instance $\pi$. The first step of Acckb is to call the EvalNode* subroutine (FIG. 4) which differs from the EvalNode subroutine (FIG. 3), in one important way. If the answers for all relevant tests are provided in the training example, the EvalNode* subroutine returns the repair which would be returned by EvalNode (i.e., by $S_{KB}$). In this event, AccKB returns 1 or 0 depending on whether EvalNode* has returned the correct repair. However, if EvalNode* encounters a test whose value is not provided in $\pi$, it terminates returning the value '?'. In this event, AccKB invokes the PartialMatch subroutine described in FIG. 5.

At this point it is necessary to introduce the notion of a path in a knowledge base. Let H(KB) be the set of all paths in a knowledge base. Then, a path, $h \in$ H(KB), has the same syntax as a training instance, i.e., h=<$\pi$, r>, and satisfies the conditions, EvalNode*(root(KB),$\pi$)=r $\in$ R, and every test in $\pi$ is reached at least once by EvalNode*. In other words, $\pi$ is a minimal set of tests and values such that $S_{KB}$ will return the repair r, and removing any single test from $\pi$ will result in EvalNode* returning '?'. (We do not consider any paths that terminate in $r_{195}$, "No Repair Found.") For instance, <{$T_Z$/+, $T_A$/+, $T_C$/--, $T_D$/+}, $r_D$) is a path of the knowledge base shown in FIG. 2, as is <{$T_Z$/+, $T_A$/--, $T_B$/+, $T_E$/+}, $r_E$>. However, <{$T_Z$/+, $T_A$/+, $T_B$/+, $T_C$/--, $T_D$/+}, $r_D$>is not a path (as it includes the extra test $T_B$), nor is <{$T_Z$/+, $T_A$/+, $T_D$/+}, $r_D$) (as it is missing test $T_B$), nor <{$T_Z$/+, $T_A$/--, $T_C$/--, $T_D$/+}, $r_D$> ($T_A$ must be + for $S_{KB}$ to return $r_D$), nor <{$T_Z$/+, $T_A$/+, $T_C$/--, $T_D$/+}, $r_E$) (wrong repair). Note that if the same test occurs twice on the same path (two nodes may have the same test, or one's test may be the negation of the other), then the test is mentioned only once in the path; needless to say, the test must have the same result for both nodes.

If a fault hierarchy KB is a tree, H(KB) will have exactly as many paths as there are leaf nodes. If KB is not a tree but is a DAG (directed acyclic graph), the number of paths (in the worst case) can be exponential in the number of nodes which have multiple parents (for example, node E in FIG. 2). Fortunately, in practice, fault hierarchies tend to have few nodes with multiple parents. Note that H(KB) may have multiple paths which have the same repair, either due to KB being a DAG (as opposed to a tree), or due to more than one leaf node having the same repair. H(KB) can be easily computed by beginning at root(KB) and descending KB in a depth-first fashion and keeping track of the nodes visited.

Figure 5:
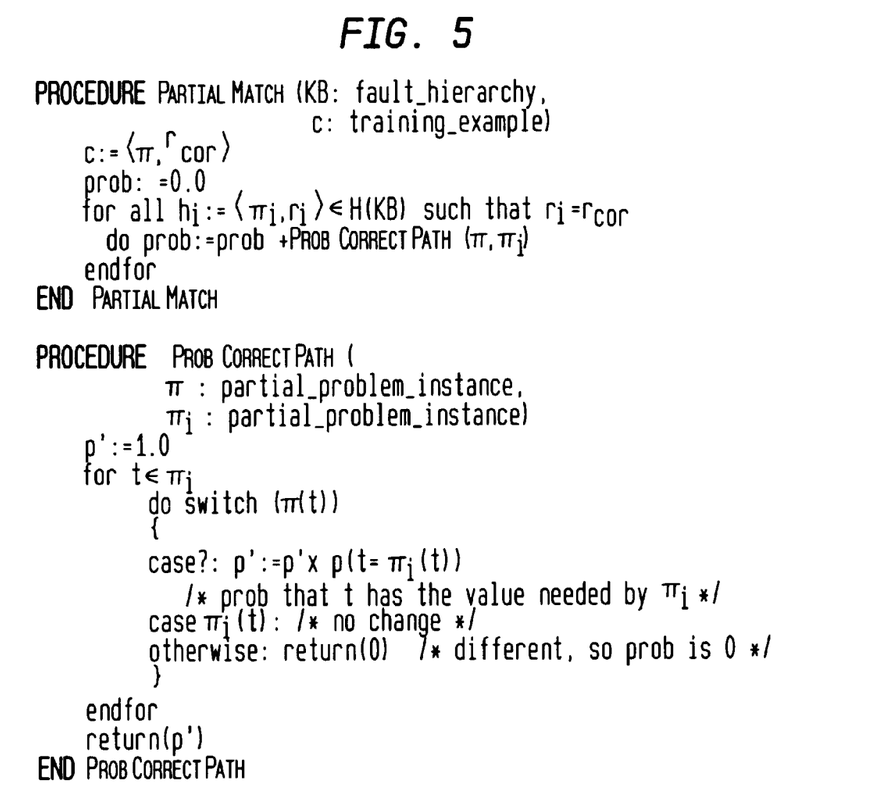
FIG. 5 illustrates the PartialMatch and ProbCorrectPath Subroutines of one embodiment of the present invention.

Given a training case c=<$\pi$,$r_{cor}$>, the PartialMatch algorithm first selects all paths $h_i$=($\pi_i$,$r_i$) in H (KB), such that $r_i$=$r_{cor}$. Then, for each such path, the ProbCorrectPath subroutine (see FIG. 5) computes the probability that $\pi$ will be the same as $\pi_i$. This is done by comparing each test t in $\pi_i$ with the value of the same test in $\pi$ and determining the probability, p'(t), that the test is correctly answered. This subroutine uses $$p'(t) = \begin{cases} 1 & \text{if } \pi(t) = \pi_i(t) \\ p(t(n)) & \text{if } \pi(t) = ? \\ 0 & \text{otherwise} \end{cases}$$

to refer to the probability of a node succeeding, relative to the partial assignment n. Of course, if t' is the negation of a test, i.e. t'=¬t, then p(t')=p(¬t)=1--p(t) when $\pi$(t')="?". The ProbCorrectPath algorithm implicitly uses the fault hierarchy KB and the probability information p(•).

The following will describe the theory revision task. The main Delta routine (FIG. 6) takes as input an initial hierarchy $KB_0$ and a set of labeled session transcripts, C={$c_j$}. Delta uses a set of transformations, $\Theta$={$\theta_k$}, where each $\theta_k$ maps one hierarchy to another. Delta invokes the ComputeNeighborhood subroutine (FIG. 8) which considers four classes of revision operators:

each Delete$_{par,n}$ revision operator deletes the existing link between the node par and its child node n. Hence, Delete$_{B,E}$($KB_0$) is a hierarchy $KB_1$ that includes all of the nodes of $KB_0$ and all of its arcs except the arc from B to E. Hence, in $KB_1$, child(B, 1)=F. Notice that this deletion implicitly redefines the child(•,•) function.

each Add$_{par,n,i}$ revision operator adds a new link between par and n as the $i^{th}$ arc under par. Hence, the hierarchy $KB_2$=Add$_{A,F,2}$($KB_0$) includes all of the nodes and arcs in $KB_0$ and an additional arc from A to F, coming after <A,C> and before <A,D>. Hence, in $KB_2$, child(A, 1)=C, child(A, 2)=F,
child(A, 3)=D and child(A, 4)=E. Notice Delete$_{A,F}$(Add$_{A,F,2}$($KB_0$))=$KB_0$.

each Move$_{par1,par2,n,i}$ revision operator both deletes the existing link between par1 and n, and then adds a link from par2 to n, as the $i^{th}$ arc under par2. Hence, Move$_{par1,par2,n,i}$(KB)=Add$_{par2,n,i}$(Delete$_{par1,n}$(KB)).

each Switch$_{par,n1,n2}$ revision operator switches the order of the links from par to n1, and from par to n2. Notice each Switch$_{n1,n2,par}$ revision operator corresponds to at most two move revision operators.

Figure 7:
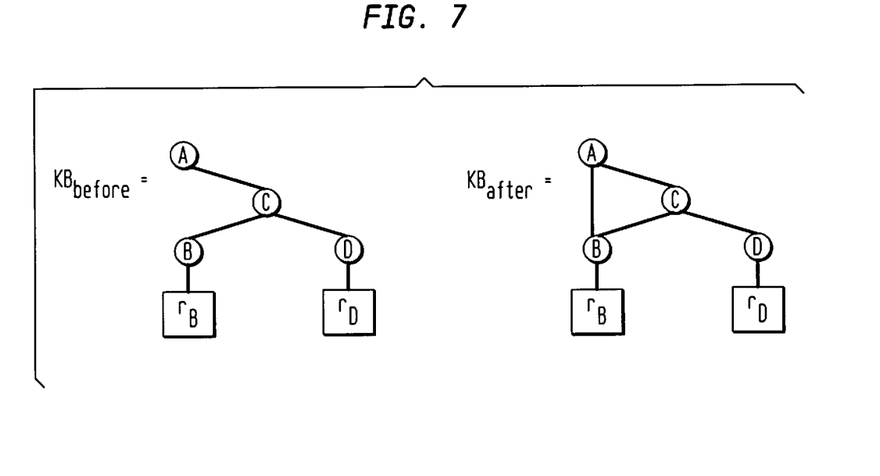
FIG. 7 illustrates the initial $KB_{before}$ and the subsequent $KB_{after}$ hierarchies used by one embodiment of the present invention.

FIG. 7 illustrates the effects of applying the revision operator Add$_{A,B,1}$ to the fault hierarchy, Kb$_{before}$. Notice that each operator has an associated operator that can undo the effects of the operator. For instance applying the operator Delete$_{A,B}$ to KB$_{after}$ in FIG. 7, will restore the fault hierarchy to Kb$_{before}$. Let N(KB)={$\theta$(KB)|$\theta_t \in$ T} be the set of KB's neighbors, which is computed by the ComputeNeighborhood(KB) subroutine shown in FIG. 8. This subroutine in turn calls four other subroutines, each of which compute the neighborhood for one operator class (add, delete, move, switch).

The CNDeleteLink(KB) subroutine (FIG. 8) is the most straightforward: it accumulates all revisions that delete a link between every parent-node/child-node pair in KB.

The CNAddLink(KB) subroutine (FIG. 8) accumulates all revisions that add a link from any non-leaf node par to any other node n, provided par is not an existing child of n and provided adding this link does not create a cycle in KB. A fault hierarchy is said to have a cycle when its graph structure has a cycle (here there are a set of tests and values such that $S_{KB}$ will never terminate). This acyclicity is confirmed by ensuring that the proposed revision will not result in a link being added from a node to one of its ancestors, as computed by the IsAncestor subroutine (FIG. 8).

Figure 8:
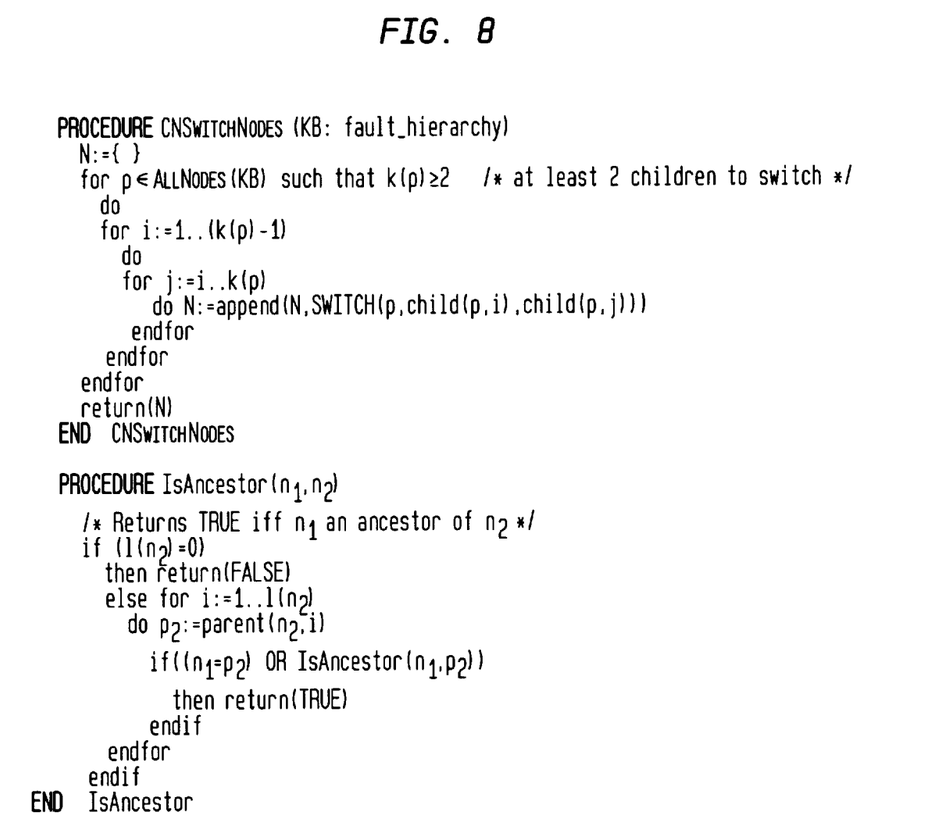
FIG. 8 illustrates the ComputeNeighborhood and associated Subroutines of one embodiment of the present invention.

The CNMoveNode(KB) subroutine (FIG. 8) accumulates all revisions that move a node n to any possible position under its parent, as well as revisions which move n to any possible positions under a different non-leaf node, provided this does not result in a cycle (FIG. 8).

The CNSwitchNodes(KB) (FIG. 8) subroutine accumulates all revisions that interchange the positions of two child nodes under the same parent.

The main Delta routine invokes the ComputeBest subroutine (FIG. 6) which uses the set of labeled instances $C=\{<\pi_j,r_j>\}$ to compute acc(KB, C) and acc(KB', C) for each KB' $\in$ N(KB). It then climbs from KB to a KB* $\in$ N(KB) if acc(KB*, C)>acc(KB, C).

The following will describe the theory revision system. Computing KB* implicitly requires obtaining the |C| values of $\{acc(KB, c_j)\}_{c_j \in C}$ to compute acc(KB, C), and also computing the |C|×|T| values of $\{acc(\theta_i(KB), c_j)\}_{i,j}$ to compute the |T| values of $\{acc(\theta_i(KB), C)\}_i$, and then determining which (if any) of these values exceeds acc(KB, C). One algorithm for this task, would first load in the KB hierarchy, then use this $S_{KB}$ to evaluate KB($\pi_j$) for each $(\pi_j, r_j) \in C$ in sequence to compute first the values of acc(KB, $\pi_j$) and then their sum acc(KB,C)=$\Sigma_j$acc(KB,<$\pi_j$,r$_j$>). It would then build KB$_1$=$\theta_1$(KB) by applying the first revision operator $\theta_1$ to KB, then load in this hierarchy to obtain $S_{KB1}$, and once again consider the |C| instances $\{<\pi_j,r_j>\}$ to compute acc(KB$_1$, C). Next, it would produce KB$_2$=$\theta_2$(KB), and go through all |C| instances to produce acc(KB$_2$, C); and so forth, for all |$\theta$| transformations. In essence, this involves sequentially computing each row of the matrix shown in FIG. 9. The revision algorithm would then take the largest of these values acc(KB*, C)=max$_i$\{acc(KB$_i$, C)\}, and climb to this hierarchy if acc(KB*, C)>acc(KB,C).

Figure 9:
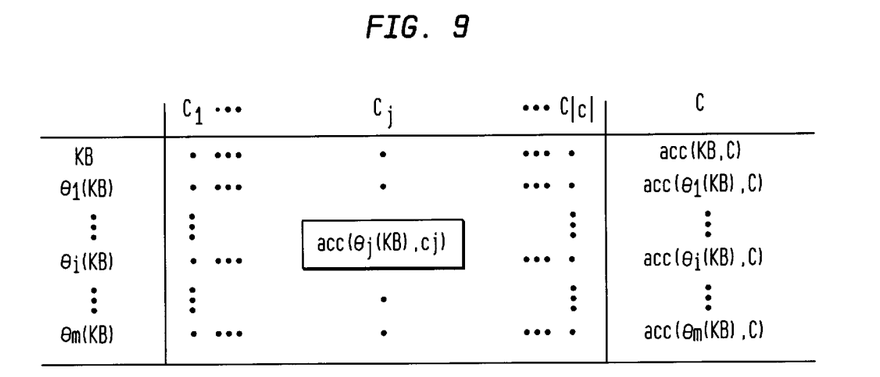
FIG. 9 illustrates the information required by any single step in the theory revision process.

The Delta algorithm effectively does the above, but reduces the computations involved by noting that each revision constitutes a very small change, while different training examples constitute a big change. Delta begins by loading $S_{KB}$ and the first example $c_1$. It then proceeds to apply the first revision operator $\theta_1$(KB) and computes the accuracy of $\theta_1$(KB) on $c_1$. Then it undoes $\theta_1$ and applies the next operator $\theta_2$ and proceeds in this manner until all operators have been applied. Finally, it unloads $c_1$ and loads in the next example $c_2$ and proceeds similarly. This reduces the computation in loading KB and the $c_j$'s multiple times, without effecting the result.

It is not intended that this invention be limited to the software arrangement, or operational procedures shown disclosed. This invention includes all of the alterations and variations thereto as encompassed within the scope of the claims as follows.

We claim:

1. A DELTA learning system for using expert advice to revise diagnostic expert system fault hierarchies comprising:

learning means for adapting a fault hierarchy of the expert system using training example data;

expert system means interfaced with said learning means, and capable of receiving input from a domain expert, said input including evaluations of said learning means;

compile means connected to said expert system means;

field user input means connected to said compile means; and session transcript means connected between said field user input means and said learning means for modifying an incorrect fault hierarchy to produce a more accurate revised fault hierarchy; wherein said learning means comprises:

ComputeNeighborhood means for computing a set of knowledge bases which are a neighborhood of an initial knowledge base; and ComputeBest means for computing the optimal knowledge base from the computed neighborhood based on labeled session transcripts provided by said session transcript means; and wherein said ComputeBest means comprises:

AccKB means for computing the accuracy of the knowledge base for a training example, said AccKB means comprising:

EvalNode* means for evaluating the knowledge base with respect to an incomplete training example; and PartialMatch means for determining a probability that the specified knowledge base will return a correct repair.

2. A DELTA learning system for using expert advice to revise diagnostic expert system fault hierarchies as claimed in claim 1, wherein said ComputeNeighborhood means uses a plurality of revision operators with each of said plurality of revision operators operating on the initial knowledge base within said expert system means to produce the revised knowledge base.

3. A DELTA learning system for using expert advice to revise diagnostic expert system fault hierarchies as claimed in claim 2 wherein said plurality of revision operators comprises:

an add operator (CNAddLink);

a delete operator (CNDeleteLink);

a move operator (CNMoveNode); and, a switch operator (CNSwitchNode).

4. A DELTA learning system for using expert advice to revise diagnostic expert system fault hierarchies as claimed in claim 2 wherein:

said plurality of revision operators move through a space of fault hierarchies with each of said plurality of revision operators mapping one hierarchy to a slightly different hierarchy.

5. A DELTA learning system for using expert advice to revise diagnostic expert system fault hierarchies as claimed in claim 1 wherein said PartialMatch means further comprises:

ProbCorrectPath means for computing the probability that problem instance n which is part of the training example will correspond to a problem instance $n_i$ representing one path through the fault hierarchy.

6. A DELTA learning system for using expert advice to revise diagnostic expert system fault hierarchies as claimed in claim 1 wherein:

said EvalNode* means evaluates any knowledge base from a neighborhood on a collection of complete training instances by simulating a diagnostic question and answer session.

7. A DELTA learning system for using expert advice to revise diagnostic expert system fault hierarchies as claimed in claim 1, wherein:

said EvalNode* means evaluates any knowledge base from a neighborhood by starting at a root node using previously stored information including questions with answers until evaluation ends with a recommended repair or if no diagnosis can be found, evaluation ends with no repair found.

8. A DELTA learning system for using expert advice to revise diagnostic expert system fault hierarchies as claimed in claim 1, wherein:

said PartialMatch means returns a probability that results in a correct repair for a knowledge base.

* * * * *